US009026949B1

(12) United States Patent
Carmi et al.

(10) Patent No.: US 9,026,949 B1
(45) Date of Patent: May 5, 2015

(54) CONFIGURATION-MANAGEMENT USER INTERFACE EMPLOYING SEARCHABLE TAGS

(75) Inventors: Eyal Carmi, Ramat Gan (IL); Oren Danewitz, Tel Aviv (IL); Rotem Shacham, Ramat Gan (IL)

(73) Assignee: Avaya Inc., Basking Ridge, NJ (US)

( * ) Notice: Subject to any disclaimer, the term of this patent is extended or adjusted under 35 U.S.C. 154(b) by 1365 days.

(21) Appl. No.: 12/177,477

(22) Filed: Jul. 22, 2008

(51) Int. Cl.
 G06F 3/00 (2006.01)
 G06F 3/048 (2013.01)
 G06F 15/177 (2006.01)
 G06Q 10/06 (2012.01)

(52) U.S. Cl.
 CPC ..................................... *G06Q 10/06* (2013.01)

(58) Field of Classification Search
 USPC .......................................................... 715/854
 See application file for complete search history.

(56) References Cited

U.S. PATENT DOCUMENTS

| 5,172,313 | A  | * | 12/1992 | Schumacher ................. 705/7.27 |
| 5,873,108 | A  | * | 2/1999  | Goyal et al. .................. 715/203 |
| 7,054,818 | B2 |   | 5/2006  | Sharma et al. |
| 7,069,291 | B2 |   | 6/2006  | Graves et al. |
| 7,069,497 | B1 | * | 6/2006  | Desai ............................ 715/205 |
| 7,086,000 | B2 | * | 8/2006  | LaMarca et al. .............. 715/234 |
| 7,216,350 | B2 |   | 5/2007  | Martin et al. |
| 7,289,964 | B1 |   | 10/2007 | Bowman-Amuah |
| 7,315,826 | B1 | * | 1/2008  | Guheen et al. ................ 705/7.29 |
| 8,024,211 | B1 | * | 9/2011  | Cohen ........................... 705/7.14 |
| 2001/0011366 | A1 | * | 8/2001  | Beck et al. .......................... 717/1 |
| 2002/0116394 | A1 | * | 8/2002  | Van Doorn .................. 707/104.1 |
| 2002/0156712 | A1 | * | 10/2002 | Rambhia .......................... 705/36 |
| 2003/0200288 | A1 | * | 10/2003 | Thiyagarajan et al. ........ 709/221 |
| 2006/0184410 | A1 | * | 8/2006  | Ramamurthy et al. ........... 705/8 |
| 2007/0162324 | A1 | * | 7/2007  | Suzuki et al. ..................... 705/9 |
| 2007/0185868 | A1 | * | 8/2007  | Roth et al. ......................... 707/6 |
| 2008/0221964 | A1 | * | 9/2008  | Berkovitz et al. ................ 705/9 |
| 2008/0270597 | A1 | * | 10/2008 | Tenenti .......................... 709/224 |
| 2009/0013255 | A1 | * | 1/2009  | Yuschik et al. ............... 715/728 |
| 2009/0204470 | A1 | * | 8/2009  | Weyl et al. ......................... 705/9 |
| 2009/0254336 | A1 | * | 10/2009 | Dumais et al. .................... 704/9 |

OTHER PUBLICATIONS

Ben Chetrit, "Tag Based Views for Role Based Access Control", U.S. Appl. No. 12/029,588, Feb. 12, 2008, 19 pp. in application and four pages of figures, USA.

* cited by examiner

*Primary Examiner* — Stephen Alvesteffer

(57) ABSTRACT

A Configuration-Management User Interface generally includes (A) accepting at least one tag-related task description from a user of a telephony management screen and (B) using the at least one tag, providing substantially-simultaneous navigation support for the user's activity on the screen. Embodiments of the instant interface include, for tags of a telephony management GUI screen, respective task-specific user-interactive query access into a logical organization of the tags; and a work-flow navigation response from a current screen accepting a query to at least one other telephony management GUI screen. The instant interfaces are mutually compatible with RBAC restrictions.

20 Claims, 3 Drawing Sheets

CONFIGURATION-MANAGEMENT USER INTERFACE EMPLOYING SEARCHABLE TAGS

TECHNICAL FIELD

The present invention generally relates to software-centric tools and related graphical user interfaces that are used in the development, establishment, ongoing maintenance, and occasional upgrading of configurable systems, such as telephone systems. More specifically, the present invention relates to user interface technologies that are preferably capable of facilitating labor-saving logical configurations and/or organizational clustering of multiple user interface items, when applied to managing telephony, IP telephony systems, or the like.

BACKGROUND ART

There is a longstanding general problem of providing proper configuration for telephony systems, since this normally involves accomplishing numerous complicated tasks. Typically, many different management screens need to be accessed in order to enable a telephony feature. Accordingly, it is often the case that the person assigned to accomplish such a task is himself highly-trained to understand specific applicable telephony terminology and interdependent functionality of these screens, and to recognize the completeness or incompleteness of his interactions with the numerous management screens. Simply stated, today it is often the case that the person assigned to enable a telephony feature must be an expert; in each combination of telephony systems' implications of his respective telephony feature enablement.

For typical customer telephony management tasks, such as setting up the switch/feature server or configuring an existing communications switch/feature server, previous attempts to reduce telephony management complexity have used two types of solutions: Menu Hierarchies and Task Wizards.

Menu Hierarchies are user interface elements which are grouped in a hierarchy of menus or tree controls, according to the system designer's notion of relationships between different elements. For instance, monitoring-related forms might be grouped together under the "monitoring" menu or tree-branch. In some cases, an additional "navigation" dimension is offered by hyperlinks connecting elements in a non-hierarchical manner. A severe limitation of this approach is that complex systems (e.g., an IP PBX) typically have many relationships between management elements that are difficult (and sometimes impossible) to model in a way which will make it easy for the user to navigate between them while performing a given task. For instance, it might be possible that, when troubleshooting a given element of a system, the user might need to efficiently navigate between a provisioning form and a monitoring form, which the system's designer had never perceived to be connected in a way that will merit a hierarchical or a hyperlink relation.

Task Wizards relate to a set of management elements that are related to a given task (e.g., forms) and are grouped together in a workflow that directs the user- to a predetermined order of operations needed to perform a certain task. Here, as in the Menu Hierarchies methodology, the system's designer has prescribed a set of tasks (e.g., installation), while scenarios without predetermined direction, such as troubleshooting, become potentially intractable under this methodology.

Considering Menu Hierarchies and Task Wizards together, we have come to recognize that the logical order and organizations of operations (to accomplish even a predetermined task) may be reasonable and straightforward to the systems designer, who resides in a telephony intense culture, and simultaneously vague and incomprehensible to a customer, who resides in a business (non-telephony) culture. Typically, the customer is far more focused on his methods of doing business than on the technicalities of the telephony instantiation, which he must set-up or configure in order to return to his more-pressing (non-telephony technology) business activities.

Considering Menu Hierarchies and Task Wizards together from another vantage (the globalized marketplace), the system's designer may presume certain functional and organizational conceptualizations as being commonplace to persons of his national origin, while these same conceptualizations may seem awkward or oblique to persons educated according to another national organization standard, linguistic grammar, etc.

Now, the longstanding need in the telephony arts is more specifically (A) for easing and simplifying the currently-complex process of configuring an existing switch/feature server; and most particularly (B) for setting up the switch/feature server to work properly as required by the customer setup. Core components for meeting this need (to provide general and specific progress to overcome this longstanding need) are well-known in the telephony arts (e.g., components found in four recently granted U.S. Pat. Nos. 7,289,964-7,216,350-7,069,291-7,054,818—each briefly described below). However, perhaps because of the peculiarly compartmentalized nature of the telephone technology industry, the integration of these core components (e.g., tags, indexing, user interfaces, navigation, and work-flow management—all in telephony technology applications) has neither been proposed nor demonstrated for this purpose.

U.S. Pat. No. 7,289,964 "System And Method For Transaction Services Patterns In A Net-centric Environment" relates to embodiments of a method for implementing transaction-services patterns, comprising the steps of: (a) batching logically related requests for reducing network traffic, including the steps of managing a group of business objects necessary for a transaction in a logical unit of work, and grouping the logically related requests received from the logical unit of work into a single network message, wherein the logically related requests include at least a dependent batched request and a parent batched request; (b) indicating whether the dependent batched request depends on the response to the parent batched request, including the steps of receiving a register that the dependent batched request is dependent upon response data from the parent batched request, receiving a response to the parent request, directing data from the response to the parent request to the dependent batched request, and receiving a response to the dependent batched request based on the response to the parent request; (c) sending the single network message to the group of business objects necessary for the logical unit of work; (d) sorting the logically related requests that are un-batched from a batched message; and (e) providing multiple logical units of work operating concurrently, wherein the logical unit of work is one of the multiple logical units of work, such that each of the multiple logical units of work manipulates at least one of the group of business objects that is common to each of the multiple logical units of work, including the steps of creating a copy of the common business object for each of the logical units of work such that the copy of the common business object for each of the logical units of work is a separate instance of the common business object, and verifying that a change to one instance of the common business object does not change the other copies of the common business object.

U.S. Pat. No. 7,216,350 "Methods And Apparatus For Call Service Processing By Instantiating An Object That Executes A Compiled Representation Of A Mark-Up Language Description Of Operations For Performing A Call Feature Or Service" relates to embodiments of a method for providing telecommunications services, the method comprising the steps of: generating a compiled representation of a textual description in a mark-up language of operations for performing a call feature or a call service; instantiating a feature object embodying the compiled representation; instantiating a context object that maintains information regarding a present state of the call feature or service in response to a boundary event with respect to the call service or the call feature; the context object signaling the feature object in regard to events occurring with respect to the call feature or the call service; and the feature object responding to said signaling from the context object by effecting execution of one or more of the operations in the compiled representation of the textual description in the mark-up language, and passing notification of at least selected events to the context object, wherein the textual description defines a set of rules and actions for providing the call service, said rules and actions corresponding to a call policy associated with a subscriber.

U.S. Pat. No. 7,069,291 "Systems and Processes for Call and Call Feature Administration on a Telecommunications Network" relates to embodiments of a process for providing instructions to a telecommunications switch, said process comprising: (A) receiving from said switch a request for instructions for telecommunications services to be provided; (B) with a service agent, responding to said request, by performing steps comprising: (i) generating a query for transmission over an IP network for retrieving from a knowledge base information relating to the services to be provided by said switch in response to the request; and (ii) formulating instructions to said switch based on the results of said retrieval by converting to one or more switch instructions logic contained in information retrieved from the knowledge base, the switch instruction being used by said switch to respond to said request; (C) forwarding to said switch in real-time the results of said formulation; and (D) indexing the location of said records in said knowledge base according to keywords contained therein.

U.S. Pat. No. 7,054,818 "Multi-Modal Information Retrieval System" relates to embodiments of a method, comprising: receiving a document in a structured language that includes tags associated with portions of the document; using said tags to provide a speech mark-up language version from said document; and using said tags, and the same said document, to provide a visual mark-up language version from said document.

Summarizing, in a critical aspect, the problem is to provide facile user-safe means (A) for easing and simplifying the currently-complex process of configuring an existing telephony switch/feature server; and/or (B) for setting up the switch/feature server to work properly as required by the customer telephony setup. In this context, facile, from the customer vantage, means easily adaptive to the organizational presumptions of how he undertakes to accomplish his configuring and/or setup tasks. In this context, user-safe, from the systems designer vantage, means including sufficient structural safeguards to navigate the user "forwards" to complete his task and to navigate the troubleshooter "backwards" to rectify complex combinatorial functional interactions, including human-error-introduced particulars.

Clearly, the current circumstance is that those working in this area have a high level of technical knowledge. Perhaps this has led to a failure to perceive the great economic benefits which should accrue from labor cost savings from a system (i.e., the instant invention interface) that would allow such responsibilities to be accomplished by those of substantially lower technical understanding. Accordingly, while the long-standing need may at first be perceived as simply a luxury item to ease the professional responsibilities of the highly trained telephony technician, in fact appreciating the long-standing need presents an opportunity to vastly improve the labor economics of a large segment of the trained telephony technician population by assigning many of their current tasks to individuals of substantially lower levels of telephony understanding. Proceeding along these lines, one should even be able to empower customers to accomplish more configuration and setup tasks without need to access customer support service providers.

DISCLOSURE OF INVENTION

The aforesaid longstanding needs are significantly addressed by embodiments of the present invention, which specifically relates to a Configuration-Management User Interface. This instant User Interface is an operating protocol, related enabling software centric systems, and efficiency-directed algorithms that are especially useful in man-computer interactions wherein there is an exemplary ongoing need (A) for easing and simplifying the currently-complex process of configuring a configurable system, such as a telephony switch/feature server; and/or (B) for setting up the switch/feature server to work properly as required by the customer setup.

The instant invention relates to embodiments of a Configuration-Management User Interface that comprises: a software system (A) accepting at least one tag related to a task description from a user of a telephony management screen, and (B) using the at least one tag, providing navigation support for the user's activity on the screen substantially-simultaneously with said activity. A non-limiting exemplary table of tags with respective related task descriptions is presented below ("Avaya Tag Table").

According to an embodiment, the instant Configuration-Management User Interface further includes software for (A) tagging the telephony management screen with at least one tag, and (B) incorporating the at least one tag into a task-sensitive user navigation support model. Logically, the model is a directed, and preferably weighted, topology of necessary data within user tasks within telephony systems configurations. However, according to a minimal exemplary view of the instant invention, the model need only be a plurality of set theoretic aggregations, clusterings, and/or intersections of tags, and preferably aliases of the tags.

Now, turning to a first variation of the embodiment, the at least one tag corresponds to a predetermined data relationship between a task label and at least one data fragment that is to be provided by the user to the screen. A "data fragment" in the context of the instant invention is any data item provided by the user. For example, it is the answer that the user provides to the system on a telephony management screen form or field, where this answer may be typically directly provided by the user, selected by the user from a general menu, selected by the user from a smart circumstance-sensitive menu (that sorts or only presents reasonable answers for user selection), or the like.

Furthermore, according to another variation of the embodiment of the Searchable Tags Management User, providing substantially-simultaneous navigation support includes imposing a user-specific navigation restriction according to an RBAC model structure for at least one task of said task description. Embodiments of the instant invention provide a potentially-comprehensive model of all possible (viable) ways to accomplish all possible telephony-management screen-facilitated tasks. The RBAC is a security-complementary restriction to this all-possible-ways "opportunity"—hopefully most relevant for limiting the various damages that might be perpetrated on the telephony system by unqualified or malicious users.

Please note, embodiments of the present invention are herein described with a certain degree of particularity; however, those versed in the art will readily appreciate that various modifications and alterations may be carried out without departing from either the spirit or scope of the invention as hereinafter claimed.

In telephony (e.g., PBX, VOIP, mobile, etc.), system management screens (most typically as a graphic user interface) are used to allow the authorized person (e.g., technician, customer, etc.) to enter various data items and design configurations decisions—as part of the setting-up and/or configuring of a switch/feature server. While these system management screens may be looked at as forms to be filled in, a more precise view of the screens includes: that they are composed of data fragments (answers to specific queries for data items and/or design configuration decisions) and instructions to the authorized person; that these fragments and instructions are aggregated into at least one preferably-interactive interface; and that the interfaces are threaded into various predetermined or instantly-configurable work-flow scenarios.

Now, various levels of physical (e.g., the initial assigned label), logical, and/or linguistic tags may be provided for each of the data fragments, interfaces, and/or work-flow scenarios. By procedural recursion, the tags may be assigned by user input, using editorial transformations and associations to standard telephone nomenclature sets or to user-community jargon euphemisms or to individual user-peculiar labels—like shortcut names or favorites' titles.

Moving up a level, just as the data fragments are grouped into interfaces and the interfaces are structured into work-flow scenarios, likewise the respective tags are interrelated in kind. Accordingly, various data-base organizations may be applied to the fragment and interface collections (e.g., in any of the well known Boyce-Codd normal forms—"BCNF") while the interface and work-flow scenarios may be kept and classified using RBAC-resembling flat, hierarchical, constrained, symmetric model-structures (for further RBAC references—see "Sandhu, Ferraiolo, and Kuhn" citation—below).

Turning to particularly-practical embodiments of this instant invention, after tags are assigned and/or extended, user tools are provided (A) to navigationally guide the user to functionally inter-dependent data fragments (and preferably respective instructions, validation parameters, and other user/customer support documentations, etc.) which collectively are known (to the ordinary persons of this art) and/or ad-hoc forms and other logically more variable-tolerant interfaces; and (B) to navigationally guide the user to functionally inter-dependent interfaces which collectively are known as work-flow patterns for accomplishment of predefined and/or ad-hoc tasks (e.g., troubleshooting, simulations, fault-tolerance testing, and the likes)—substantially flat, hierarchical, constrained, or symmetric model-structures. The user tools typically take the form of supplemental graphical user interfaces—portraying to the user any of various views of aliases of tags, work-flow paths, validation alerts/alarms, and the like). Certainly, it is an important feature of the instant invention to provide the user with an interface allowing searching of these tags, thereby facilitating a more facile Management User Interface that is applicable to PBXs, VoIP, mobile telephony, and like telephony-related user interfaces—especially for the setting-up and/or configuring of a switch/feature server.

It is often a high complexity task to configure a telephone system. Typically, many different system management screens need to be accessed in order to enable certain telephony features. Using tags, the untrained customer easily searches and accesses all pages that are relevant to a feature. One may reasonably observe that tags, meta-tags (or composite tags), and workflow configurations are substantially used in interne search technologies—but they have curiously not been applied to user activities for telephony set-up and configuring.

Simply stated, GUI tag-based searches are a useful embodiment of the instant invention as applied to PBX management tools and to VOIP, mobile telephony, and other telephony-related user management tool interfaces—especially for accomplishing complex telephony management tasks. Specifically, after the levels of content are tagged, providing search facilities of these (and related) tags allows the user to "arrive at" (access) groups of appropriate locations (in the complex topology of management screens, etc.)—thereby significantly lowering the threshold of expertise need for user action.

In order to accomplish this, each management page will contain meta-data ("tags") that describe features and fields which are relevant to this page. There are a number of ways that these (physical and/or logical) tags may be established and associated with the respective page. Accordingly, there are a few substantially mutually-compatible classes of instant embodiments for tagging sets of management elements (e.g., forms, screens, GUI elements, GUI clusters, GUI collections, menus, and the like) and for making good use of the management elements so tagged—by facile user-safe navigations.

According to a conceptual construction, there are four progressively-broadening classes of instant invention implementation embodiments; hereinafter "Tagging (I)" thru "Tagging (IV)".

Tagging (I): Alpha-numeric content items and/or elements (and/or proximity clustered combinations thereof) on the page (or associated by the system therewith) may be manually and/or automatically extracted, catalogued, parsed, filtered, prioritized, and/or associated with synonyms, keywords, categories, or the like. Using these tags, the user of a management application will be able to do a search within a management-applications navigation window, and come up with pages that are relevant for his requested feature.

The following Avaya Tag Table (Avaya Ref.: CID-128823) describes a list of tags typically relevant for this type of operation.

| # | Avaya Tag | Mnemonic | Description |
|---|---|---|---|
| 1 | Central Management | DOCM | Items that can also be managed from Distributed Office Central Management |

-continued

| # | Avaya Tag | Mnemonic | Description |
|---|---|---|---|
| 2 | Basic Skill Level | BASL | Items that require the lowest level of technical skill set/the basic administration items (e.g., IP address of the DOBB) |
| 3 | Intermediate Skill Level | INSL | All items that are above basic and below advanced (e.g., Telephony Routing) |
| 4 | Advanced Skill Level | ADSL | Items that only highly-skilled personnel should ever tweak (e.g., Loss plan) |
| 5 | Lawful Intercept | LAWI | Items relevant for performing lawful intercept duties |
| 6 | Configuration | CFG | All items that configure the Distributed Office ("DO") |
| 7 | Monitoring | MON | Monitoring & status monitoring |
| 8 | Maintenance | MNT | Maintenance operations (tests, SW upgrades, etc.) |
| 9 | Telephony | TEL | Telephony items |
| 10 | Platform | PLAT | All Platform items (e.g., Ethernet interfaces) |
| 11 | Security | SEC | Security-related features |
| 12 | Secrets | SCRT | Secrets (passwords) |
| 13 | Configuration Admin | CFGA | Management of configuration files |
| 14 | Firmware Admin | FWAD | Management of SW/Firmware files |
| 15 | Log | LOG | Logs-related items |
| 16 | Report | REPRT | Report generation functions |
| 17 | Users | USR | User/station admin |
| 18 | Group Communications | GRPF | Group features |
| 19 | Trunk | TRNK | Trunks-related items |
| 20 | Line | Line | Station/line-related items |
| 21 | Computer Telephony Interface | CTI | TSAPI/TAPI-related items |
| 22 | Voice Mail | VM | Voice-mail-related items |
| 23 | Auto Attendant | AA | Auto-Attendant-related items |
| 24 | Local Apps | LCL | Local apps (e.g., local voice mail, local CTI) |
| 25 | Internationalization | INTR | Localization/internationalization items (e.g., language selection) |
| 26 | Alarms | ALM | Alarms |
| 27 | Service Affecting-Network | SANT | Items that potentially disrupt a network of DO |
| 28 | Service Affecting-System | SASY | Items that potentially disrupt a single system of DO |
| 29 | Service Affecting-User | SAUS | Items that potentially disrupt a single user/station of DO |
| 30 | Service Affecting-Service | SASR | Items that potentially disrupt a single service of DO |
| 31 | Public Networking | PUNT | Items that relate to PSTN networking |
| 32 | Private Networking | PRNT | Items that relate to inter-branch SIP networking |
| 33 | Data Services | DSRV | Items that relate to data infrastructure services rendered by the DOBB (e.g., DHCP service, file server service) |
| 34 | AGS Items | AGSS | Global Services items |
| 35 | Feature Activation | FACC | Feature activation |
| 36 | Ethernet Networking | ETHP | Ethernet Ports & VLAN features |

Notwithstanding the "Tagging (I)" non-limiting exemplary tags and descriptions of the Avaya Tag Table (above), other general and specific tags are relevant for these and further embodiments of the instant invention; such as for networking at other levels of Open Systems Interconnection (OSI) standard reference model, and the like.

Tagging (II): A systems monitor may observe management inter-page navigation activities of users of varying degrees of expertise, from telephony-inept customer types to telephony-savvy industry experts. Using these inter-page navigation activities as a basis, the system may automatically create and assign logical tags to the respective pages. Using these logical tags, the user of a management application will be able to consult within a management-applications navigation window and come up with pages that are probably relevant for his requested feature. Of course, the expert may be enabled with a facility to complement his activity with keywords selected from a tagging application—thereby forming a method for the ongoing improvement of the Tagging (I) method (above). Furthermore, by this Tagging (II) method, a user may come to be more focused on operational steps that are compliant with his current hardware and software configuration—an aspect which becomes more skewed as systems span independent and concurrent inclusion of archaic legacy components, instant market-typical installations, and best-available-technology beta-testing features.

Tagging (III): Various logical-network topology models may be established for users of various levels of expertise. According to a first meta-view, a grand directed (and preferably weighted) graph of inter- and intra-screen page navigations may be established using Tagging (I) and Tagging (II). According to a second meta-view, various predefined spanning tree fragments may be transformed from the Menu Hierarchies and Task Wizards and onto the first meta-view directed and weighted graph. According to a third meta-view, customer-service-support providers may configure new instant Menu Hierarchies and Task Wizards according to the needs of frustrated customers—and these new instant Menu Hierarchies and Task Wizards may in turn likewise be transformed onto the first meta-view directed and weighted graph.

According to a fourth meta-view, proactive filters may be applied to the directed and weighted graph by imposing permission and restriction boundaries—for example, based on Role Based Access Control (RBAC) "rank and section" of the user; thereby permitting a security-cleared expert to navigate in ways far beyond those of the potentially-hazardous novice user. According to a preferred embodiment of the fourth meta-view, the user of the management application will be able to edit and save meta-data for a specific page and for a dictionary of aliases thereof. This will enable the user to customize future searches of the management application, thus enhancing its usability and productivity according to its specific business goals. Of course, it is preferable that the Tagging (I) and/or Tagging (II) methods be applied to all Menu Hierarchies, Task Wizards, and the like.

Note: In computer systems security, Role Based Access Control (RBAC) is a well-known approach to restricting system access to authorized users, replacing (albeit simultaneously capable of simulating) earlier mandatory access control (MAC) and discretionary access control (DAC). The concept behind role-based access control has been around for years, but it was first defined as a formal methodology in 1992 by David Ferraiolo and Richard Kuhn from the National Institute of Standards and Technology (NIST). Their definition was taken by the American National Standards Institute and worked into a standard methodology for role-based access control called ANSI/INCITS-359/2004.

Tagging (IV): A dictionary of aliases to keywords (parallel tags) will be held as a management application. Keywords are words that are often used within the PBX, IP, SIP, and/or Telephony context, and the like. In addition to keywords from standard telephony nomenclatures, these aliases may include slang terms, translations of any of these into other languages, equivalent and substantially-equivalent terms according to various documents of standards, specifications, and versions thereof, and the like. Preferably, when the management application user searches for a page, the search term is matched against existing tags, and, in addition, tested to the dictionary to see if it matches an alias. If so, then the relevant keyword is also tested against the existing tags.

Simply stated, the basic embodiment of the instant invention is a Configuration-Management User Interface employing searchable tags—which seems to be a familiar workflow management technique in web searches—but has not heretofore been used by management applications in the telephony field. Furthermore, there is significant overlap between tags of RBAC infrastructure views and those intrinsic embedded views specific to domain knowledge for PBX-type management.

Alternatively stated, a basic instant invention embodiment configuration has analogous constructs to four recent RBAC models (flat, hierarchical, constrained, symmetric) described by Sandhu, Ferraiolo, and Kuhn in "The NIST model for Role-Based Access Control: Towards a Unified Standard" http://csrc.nist.gov/staff/Kuhn/towards-std.pdf (hereby incorporated by reference)—albeit, in the instant invention, these models are substantially applied as modeling templates for organizing navigation among a large set of tagged telephony-management screens. According to an embodiment of the instant invention, RBAC is used in conjunction with the Configuration-Management User Interface whereby the interface provides positive navigation facility to the user to accomplish the respective typical tasks of configuring and/or setting up a telephony switch/feature server, while the RBAC provides negative navigation facility to restrict the specific user from operations and/or combinations of functions which are organizationally considered potentially hazardous for a technician of a predetermined grade. Thus, in this embodiment, introducing tags is a means to determine which role can access which pages. However, most importantly, in the context of the principal embodiments of the instant invention, tags are used to allow rapid configuration of the system, independent of access; accordingly, it is generally understood that there will arise a need for a wider tags dictionary than the one defined in RBAC applications. Nevertheless, the flat, hierarchical, constrained, and symmetric constructions (used in RBAC management for substantially-negative navigation) are used in many embodiments of the instant invention to provide positive navigation support, education, access, and task closure compliance.

Alternatively articulated, the instant embodiment relates to a significant improvement in flexibility and adaptability over the prior-art management of complex telephony workflow, in that it facilitates the formation of new collections of management screens, screen parts, and the like—used for configuring and/or setup (viewed at the switch, server, user, and various telephony operator vantages) of new or modified features. In a sense, using embodiments of the instant invention, the user of the system can create his own particular workflow by rapidly navigating between various elements of a complex Graphic User Interface (GUI). The user can locate and navigate to the relevant GUI functions—not only by their names—but also by relevant descriptive attributes that help him to identify the forms and controls that relate to the ad-hoc task that he has in mind. Now, by applying well-known mechanisms (such as "Favorites" or "Shortcuts"), the user can personalize his management applications to meet his needs in terms of particular workflows, of which the systems designer might have been oblivious.

BRIEF DESCRIPTION OF THE DRAWING

In order to understand the invention and to see how it may be carried out in practice, illustrative embodiments will now be described, by way of non-limiting example only, with reference to the accompanying drawing. Furthermore, a more complete understanding of the present invention and the advantages thereof may be acquired by referring to the following description in consideration of the accompanying drawing, in which like reference numbers in the Figures indicate like features and wherein.

MODES FOR CARRYING OUT THE INVENTION

Figure 1:
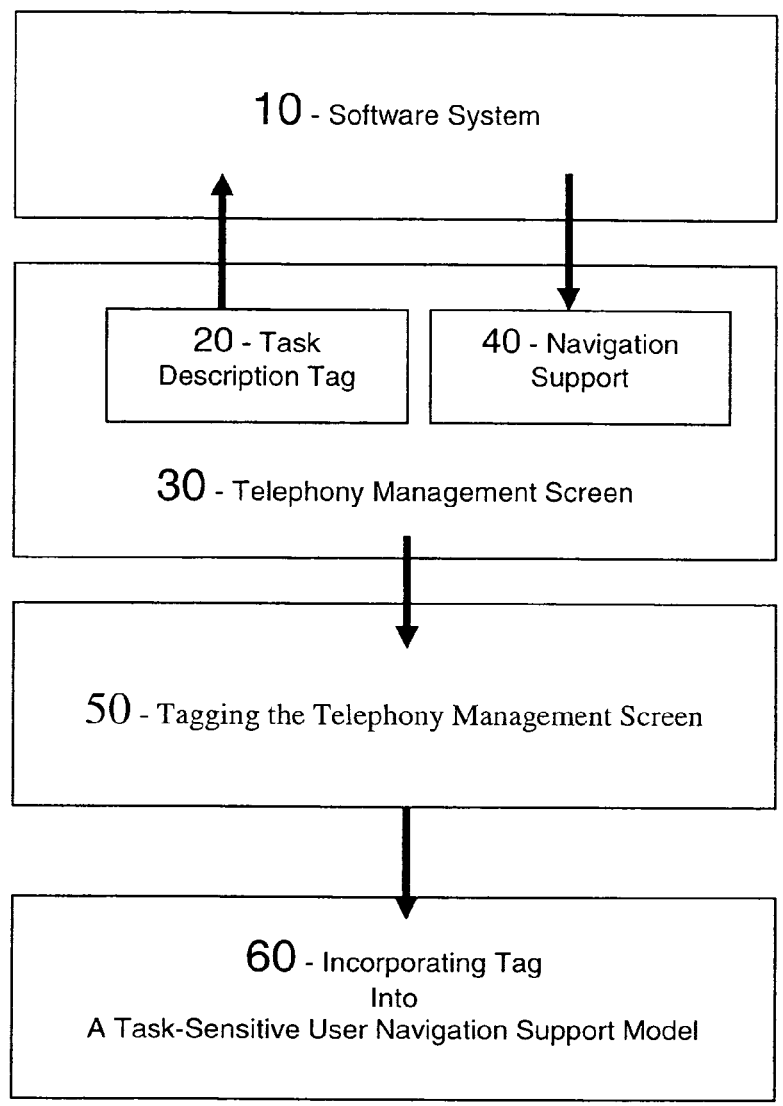
FIG. 1 is a schematic view of a typical embodiment of a Configuration-Management User Interface.

Embodiments and aspects of the instant invention may be embodied in various forms, wherein a typical embodiment (see FIG. 1) relates to a Configuration-Management User Interface including: a software system 10 for (A) accepting at least one tag 20 related to a task description from a user of a telephony management screen 30, and (B) using the at least one tag, providing substantially simultaneous navigation support 40 for the user's activity on the screen.

According to an illustrative embodiment, the instant Configuration-Management User Interface further includes software for (A) tagging 50 the telephony management screen with at least one tag, and (B) incorporating 60 the at least one tag into a task-sensitive user navigation support model (e.g., flat, hierarchical, constrained, symmetric).

Now, turning to a variation of the preferred embodiment, the at least one tag corresponds to a predetermined data relationship between a task label and at least one data fragment that is to be provided by the user to the screen.

Furthermore, according to another variation of the embodiment of the Searchable Tags Management User, providing substantially simultaneous navigation support includes imposing a user-specific navigation restriction according to an RBAC model structure for at least one task of said task description.

Figure 2:
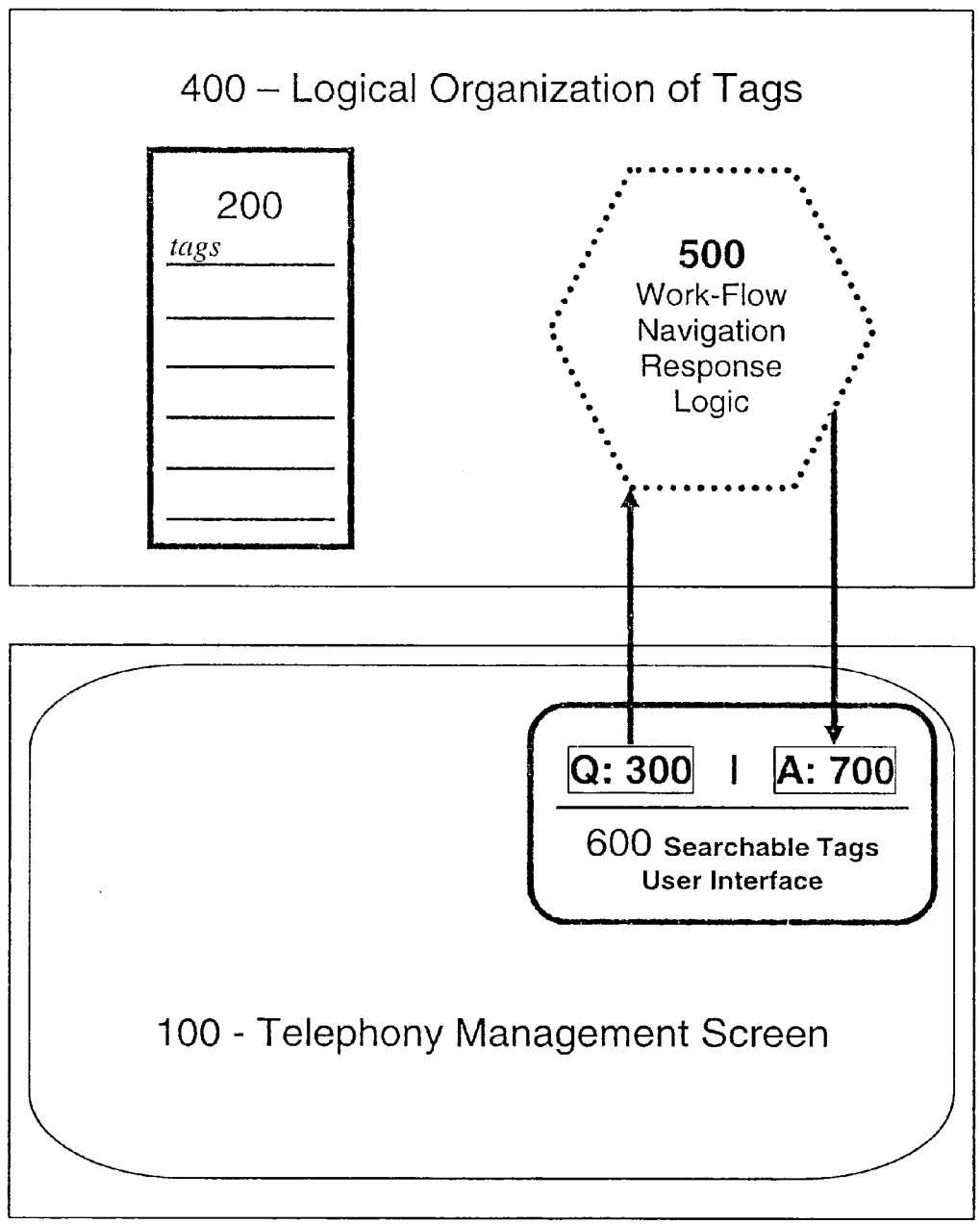
FIG. 2 is a schematic view of a "simple" embodiment of a Configuration-Management User Interface.

From another vantage (see FIG. 2), the instant invention relates to "simple" embodiments of a Configuration-Management User Interface. The interface generally comprises query and respective response activities. Specifically, there is respective task-specific user-interactive query access 300 into a (software system driven) logical organization (e.g., database, model, structure, topology representation, etc.) 400 of tags 200 of a telephony management GUI screen 100; and there is a work-flow navigation response 500 from a current (sub)-screen 600 accepting a query to at least one other telephony management GUI screen 700.

According to a first variation of the instant "simple" embodiments, the tags are selected from the list: RBAC tags, physical labels, logical code assignments, linguistic equivalents, aliases, nomenclature terms, user-assigned labels, meta-tags, and composite-tags. This provides the user with the widest latitude of how he can get navigations support from the Tags User Interface.

According to a second variation of the instant "simple" embodiments, the telephony management is selected from the list: PBX, VOIP, mobile telephony, and a combination thereof. Since we exist in an age of telecommunications technology convergence, the actual user tasks (like setup, configuration, etc.) become increasingly interrelated between the formerly substantially-independent telephony systems. From another vantage, there is tremendous market advantage to the vendor who can provide substantially-identical user interface "look and feel"—regardless of the telephony system or the convergence characteristics embedded therein.

According to a third variation of the instant "simple" embodiment, the GUI and accepting a response to the GUI are respectively selected from the list of: visual content, audio content, alphanumeric content, graphic content, schematic content, and any combination thereof. As may have been appreciated from the references cited as prior art, the GUI is not necessarily graphical, even if it may be in whole or in part; since voice-recognition, automatic text-to-speech generation, non-alphanumeric visualizations, and the like are increasingly integrating and upgrading more "traditional" GUI interfaces.

According to a fourth variation of the instant "simple" embodiment, the screen includes user-interface media. Now, many systems prefer to provide the navigation support within the same media as the telephony management "screen"; however, there are other potential arrangements where the navigation support may, perhaps for security reasons, arrive by an alternative medium. For example, the telephony management is on a computer interface to a PBX or a PVN; but since the PBX or PVN is still not in any direct communications with an external customer-support system (having the instant invention interface)—the navigation support may be delivered by SMS, email, or via other non-PBX and non-PVN paths; the support may be printed and collected—rather than being presented on the "management" screen; and such.

According to a fifth variation of the instant "simple" embodiment, the task is for configuring an existing telephony switch/feature server for a predetermined customer setup; or the task is for setting up a switch/feature server for a predetermined customer setup; or the like. Those who are familiar with telephony switch/feature server architectures will appreciate that hardware upgrades, hardware extensions, and add-on physical interfaces to new or additional telecommunications carrier equipment will expand these exemplary uses.

According to a sixth variation of the instant "simple" embodiment, the user-interactive query includes an event selected from the list: system validation, user tagging, system tagging, and a combination thereof. This item recalls the Tagging (I-IV) descriptions (above).

According to a seventh variation of the instant "simple" embodiment, the query is by an item selected from the list: tag, task, shortcut, favorite, menu designation, template name, and any combination thereof. This is to remind the reader that the user interface, according to the instant invention, need no longer be strictly according to the systems designer's view.

According to an eighth variation of the instant "simple" embodiment, the access includes an RBAC restriction. This is to remind the reader that the positive navigation support functionality of the instant invention is mutually compatible with the sometimes-negative navigational limitations of RBAC-imposed barriers.

According to a ninth variation of the instant "simple" embodiment, the logical organization is selected from the model structures: flat, hierarchical, constrained, and symmetric. Please note that the organizational topology of these model structures is identical-in-concept to the RBAC model structures—but the actual instantiations of these model structures for any real telephony management system will in virtually all likelihood have completely different actual members, connections, linkages, weightings, and the like.

Using tags, embodiments of the instant invention allow easy search and access to all pages that are relevant to a feature, without the user having to have advanced knowledge of specific telephony features. Thus, a benefit of embodiments of the instant invention is the lowering of the threshold of expertise required for a person to accomplish a task of enabling or modifying a specific telephony feature.

Setting-up and managing a telephony system become more customer-friendly. Little or no customer training is required to accomplish many tasks. Fewer hours of customer support are expected when guiding the customer through his occasional insecurities, and fewer trained-technician hours will be required where the customer is empowered to navigate management activities in an interactive format where errors are constrained and validation aspects are more auditable.

Figure 3:
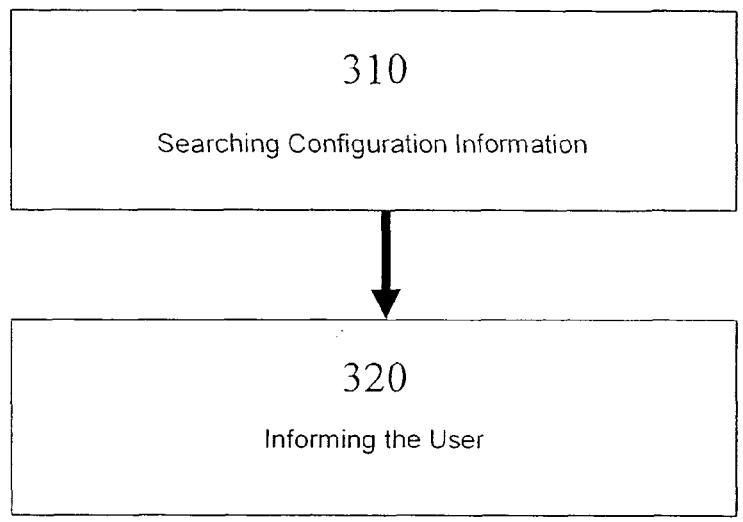
FIGS. 3 and 4 are schematic views of respective methodological and apparatus embodiments of a Configuration-Management User Interface.

Furthermore, mutatis mutandis, the instant invention also relates to embodiments (see FIG. 3) of a Configuration-Management User Interface method comprising: (a) in response to a user indicating a configurable aspect of a system, searching 310 configuration information wherein tags associated with items of the configuration information indicate relationships between the tagged items and configurable aspects of the system, to identify those of said items whose tags indicate a relationship between the item and the indicated aspect; and (b) informing 320 the user of the identified items. According to another embodiment of this method, the method further comprises: the user using the identified items to configure the indicated aspect of the system.

Figure 4:
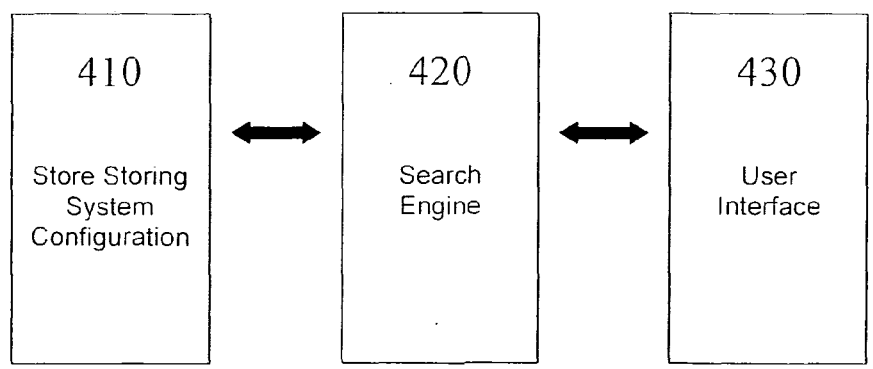

Now, in addition, mutatis mutandis, the instant invention also relates to embodiments (see FIG. 4) of a Configuration-Management User Interface apparatus comprising: (a) a store 410 for storing system configuration information and having information tagged with tags that indicate relationships between the tagged items and configurable aspects of the system; (b) a search engine 420 for searching the store to identify those of said items whose tags indicate a relationship between the item and a selected aspect; and (c) a user interface 430 for receiving from a user a selection of one of said aspects, and for indicating to the user the identified items. According to another embodiment of this apparatus, the user interface is further for enabling the user to use the identified items to configure the indicated aspect of the system.

While the invention has been described with respect to specific examples of carrying out the invention, those skilled in the art will appreciate that there are numerous variations and permutations of the instant Configuration-Management User Interface described systems, techniques, methods, and apparatus—that fall within the spirit and scope of the invention as set forth in the appended claims. By non-limiting example, we mention applying fuzzy logic to convolve aspects of a query with aspects of a partially-completed task—thereby guiding the user in real-time to navigation options according to the actions of task-successful others in similar circumstances.

Finally, please note that numbers, alphabetic characters, and roman symbols designated herein are for convenience of explanations only, and should by no means be regarded as imposing particular order on any method steps.

We claim:

1. A Configuration-Management apparatus comprising:
a store configured to store task description information and software;
a search engine configured to search the store;
a user interface coupled to the store and the search engine, and configured to accept at least one tag related to a task description residing in the store from a user of a system management screen, wherein the at least one tag related to the task description indicates a relationship between tagged items and configurable aspects of a switch/feature server, and use the at least one tag and the search engine to provide work-flow navigation support for the user's activity on the screen substantially-simultaneously with said activity, and to provide work-flow navigation support for the user's activity through an alternative medium other than the screen; and
a computer interface coupled with the search engine, and configured to direct communications related to the task description to the switch/feature server.

2. The Configuration-Management apparatus according to claim 1, wherein the store further includes software for (A) tagging the system management screen with at least one tag, and (B) incorporating the at least one tag into a task-sensitive user navigation support model.

3. The Configuration-Management apparatus according to claim 2 wherein the at least one tag corresponds to a predetermined data relationship between a task label and at least one data fragment that is to be provided by the user to the screen.

4. The Configuration-Management apparatus according to claim 1 wherein providing substantially simultaneous navigation support includes security-complementary software for imposing user-specific navigation restrictions according to an RBAC model structure for at least one task of said task description.

5. A Configuration-Management apparatus comprising:
a store configured to store task description information and software;
a search engine configured to search the store;
a user interface coupled to the store and the search engine, and configured to provide, for tags of a system management GUI screen, respective task-specific user-interactive query access into a logical organization of the tags; wherein the tags indicate relationships between tagged items and configurable aspects of a switch/feature server; and a work-flow navigation response from a current screen accepting a query to at least one other system management GUI screen, and to provide the work-flow navigation response through an alternative medium other than the current screen; and
a computer interface coupled with the search engine, and configured to direct communications related to the task-specific user-interactive query to the switch/feature server.

6. The Configuration-Management apparatus according to claim 5 wherein the tags are selected from the list: RBAC tags, physical labels, logical code assignments, linguistic equivalents, aliases, nomenclature terms, user assigned labels, meta-tags, and composite-tags.

7. The Configuration-Management apparatus according to claim 5 wherein the system management is selected from the list: PBX, VOIP, mobile telephony, and combinations thereof.

8. The Configuration-Management apparatus according to claim 5 wherein the GUI and accepting a response to the GUI are respectively selected from the list: visual content, audio content, alphanumeric content, graphic content, schematic content, and any combinations thereof.

9. The Configuration-Management apparatus according to claim 5 wherein the screen includes user interface media.

10. The Configuration-Management apparatus according to claim 5 wherein the task is for configuring an existing communications switch/feature server for a predetermined customer setup.

11. The Configuration-Management apparatus according to claim 5 wherein the task is for setting up a switch/feature server for a predetermined customer setup.

12. The Configuration-Management apparatus according to claim 5 wherein the user-interactive query includes an event selected from the list: system validation, user tagging, system tagging, and combinations thereof.

13. The Configuration-Management apparatus according to claim 5 wherein the query is by an item selected from the list: tag, task, shortcut, favorite, menu designation, template name, and any combinations thereof.

14. The Configuration-Management apparatus according to claim 5 wherein the access includes an RBAC restriction.

15. The Configuration-Management apparatus according to claim 5 wherein the logical organization is selected from the model structures: flat, hierarchical, constrained, and symmetric.

16. The Configuration-Management apparatus according to claim 5, further characterized by (A) accepting at least one tag-related task description from a user of a system management screen and (B) using the at least one tag, providing substantially simultaneous navigation support for the user's activity on the screen.

17. A Configuration-Management method comprising:
in response to a user indicating a configurable aspect of a switch/feature server through a user interface, searching configuration information within a store wherein tags associated with items of the configuration information indicate relationships between the tagged items and configurable aspects of the switch/feature server, to identify those of said items whose tags indicate a relationship between the item and the indicated aspect;

informing the user of the identified items through the user interface and through an alternative medium other than the user interface; and directing communications related to the indicated aspect to the switch/feature server through a computer interface.

18. The method of claim 17 further comprising: the user using the identified items to configure the indicated aspect of the switch/feature server.

19. A Configuration-Management apparatus comprising:

a store for storing system configuration having information tagged with tags that indicate relationships between the tagged items and configurable aspects of a switch/feature server;

a search engine for searching the store to identify those of said items whose tags indicate a relationship between the item and a selected aspect;

a user interface for receiving from a user a selection of one of said aspects, and for indicating to the user the identified items;

an alternative medium interface for indicating to the user the identified items; and a computer interface coupled with the search engine, and configured to direct communications related to the selected aspect to the switch/feature server.

20. The apparatus of claim 19 wherein: the user interface is further for enabling the user to use the identified items to configure the indicated aspect of the switch/feature server.

* * * * *